(12) United States Patent
Goto (10) Patent No.: US 7,668,520 B2
(45) Date of Patent: Feb. 23, 2010

(54) BROADCAST RECEIVING APPARATUS AND DISPLAY CONTROL METHOD

(75) Inventor: Ryo Goto, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 337 days.

(21) Appl. No.: 11/425,334

(22) Filed: Jun. 20, 2006

(65) Prior Publication Data

US 2007/0026828 A1 Feb. 1, 2007

(30) Foreign Application Priority Data

Jun. 21, 2005 (JP) ............................ P.2005-180330

(51) Int. Cl.
*H04B 1/18* (2006.01)

(52) U.S. Cl. .................. 455/185.1; 455/2.01; 455/3.01; 455/3.02; 455/3.03; 725/46; 725/34; 725/35; 725/146; 348/569; 348/570

(58) Field of Classification Search .............. 455/185.1, 455/2.01, 3.01, 3.02, 3.03; 725/46, 34, 35, 725/146; 348/569, 570
See application file for complete search history.

(56) References Cited

U.S. PATENT DOCUMENTS

| | | | | |
|---|---|---|---|---|
| 5,969,769 | A | * 10/1999 | Hamadate | .................... 348/568 |
| 6,870,573 | B2 | * 3/2005 | Yeo et al. | ..................... 348/569 |
| 2003/0140342 | A1 | * 7/2003 | Hasebe et al. | ................. 725/46 |
| 2003/0163817 | A1 | * 8/2003 | Han | ............................. 725/46 |

FOREIGN PATENT DOCUMENTS

| | | |
|---|---|---|
| JP | 2001-237789 | 8/2001 |
| JP | 2002-009920 | 1/2002 |

* cited by examiner

*Primary Examiner*—Sanh D Phu
(74) *Attorney, Agent, or Firm*—Hogan & Hartson LLP (57) ABSTRACT

By calculating a channel selection frequency on the basis of a channel selection time list in a memory, a control section automatically judges a zapping operation by a user, and performs display of a program list in which all programs being broadcasted are listed.

1 Claim, 7 Drawing Sheets

| No | CHANNEL SELECTION TIME DATA |
|---|---|
| 1 | MARCH 2 16:26:38 |
| 2 | MARCH 2 16:26:30 |
| 3 | MARCH 2 16:26:18 |
| ⋮ | ⋮ |
| 19 | MARCH 2 16:26:01 |
| 20 | MARCH 2 16:25:48 |

| No | CHANNEL SELECTION TIME DATA |
|---|---|
| 1 | MARCH 2  16:26:38 |
| 2 | MARCH 2  16:26:30 |
| 3 | MARCH 2  16:26:18 |
| ⋮ | ⋮ |
| 19 | MARCH 2  16:26:01 |
| 20 | MARCH 2  16:25:48 |

↓ CHANNEL SELECTION
(JUDGED AS ZAPPING)

FIG. 6B

DISPLAY PROGRAM LIST

↓ FIXED PERIOD OF TIME HAS
PASSED FROM LAST OPERATION

FIG. 6C

IF THERE IS
NO OPERATION
BEING PERFORMED
FOR A WHILE,
PROGRAM LIST IS
AUTOMATICALLY
TURNED INTO
NON-DISPLAY

FIG. 7A  
WATCHING TIME: 0.2 SECOND

FIG. 7B  NOT COUNT AS CHANNEL SELECTION

WATCHING TIME: 1.2 SECOND

FIG. 7C  COUNT AS CHANNEL SELECTION

WATCHING TIME: 0.2 SECOND

FIG. 7D  COUNT AS CHANNEL SELECTION

BROADCAST RECEIVING APPARATUS AND DISPLAY CONTROL METHOD

This application claims foreign priority based on Japanese Patent application No. 2005-180330, filed Jun. 21, 2005, the content of which is incorporated herein by reference in its entirety.

BACKGROUND OF THE INVENTION

1. Field of the Invention

This invention relates to a broadcast receiving apparatus, and particularly, relates to a broadcast receiving apparatus which provides a user with an effective program search.

2. Description of the Related Art

As a broadcast receiving apparatus, for example, a portable telephone in which a TV tuner is incorporated has been known (e.g., JP-A-2002-9920). In addition, in terrestrial digital broadcasting or satellite digital broadcasting, mainly, broadcasting using a transmission band of 1 or 3 segments is scheduled to be performed for a small size receiver having high portability.

Generally speaking, when a user watches/listens a program of TV, a radio, etc., a user performs an operation of searching a desired program to watch/listen by switching a channel one after another (what is called, performing a zapping) (hereinafter, arbitrarily referred to as "zapping").

With regard to such a zapping operation, various technologies have been known from a viewpoint of improving an operability of a user.

For example, a technology has been known (see, JP-A-2001-237789), in which, when a viewer instructs zapping, a screen is switched to a zapping screen, and channels are automatically scanned sequentially at intervals of a predetermined period and an image of the channel, which is displayed on a display device, changes When a viewer finds a program to view during a period of a zapping operation and decides to select the program, the zapping operation stops, and an image of the selected program is displayed on the display device (automatic zapping function).

In the meantime, most commonly, the zapping operation is not an operation that a user performs positively, but is an operation which occurs on the occasion of repeating an operation of switching to other suitable program without much attention, since a user does not like a program which is viewed at the moment. Therefore, even if the above-mentioned automatic zapping function is provided, there is high possibility that this automatic zapping function is not actually utilized, since a channel selection can be performed at short time and effectively by an user's action to switch the channel so that a user's own will is reflected, rather than activating the automatic zapping function purposely.

However, even in case that a user personally switches the channel, a time required for the zapping operation and efficiency become different depending on whether or not a user knows what program is being broadcasted by another channel.

SUMMARY OF THE INVENTION

The present invention has been made in view of the above circumstances, and provides a broadcast receiving apparatus by which a user can perform a program search effectively.

In some implementations, a broadcast receiving apparatus of the invention comprising:

a channel selection section which selects a broadcasting channel;

a storage section which stores a time information about a channel selection, which is performed at every timing of selecting the channel; and a control section which controls to display information relating to programs being broadcasted by respective broadcasting stations, when it is judged that a plurality of channel selections are performed in a first predetermined period based on the time information stored in the storage section Preferably, the control section judges, as the channel selection, at least one of a switching from an up channel selection to a down channel selection or a switching from the down channel selection to the up channel selection.

Preferably, when a new channel is selected after a second predetermined period from a previous timing of selecting the channel, the control section judges the selection of the new channel as the channel selection.

In some implementations, a display control method of the invent ion comprising:

storing a time information about a channel selection, which is performed at every timing of selecting the channel; and displaying information relating to programs being broadcasted by respective broadcasting stations, when it is judged that a zapping is performed based on the time information.

Preferably, it is judged that the zapping is performed when a plurality of channel selections are performed in a first predetermined period.

Preferably, the display control method of the invention comprising:

judging as the channel selection, at least one of a switching from an up channel selection to a down channel selection or a switching from the down channel selection to the up channel selection.

Preferably, the display control method of the invention comprising:

judging a selection of a new channel as the channel selection when the new channel is selected after a second predetermined period from a previous timing or selecting the channel.

According to the present invention, a user can perform a program search effectively.

DESCRIPTION OF THE PREFERRED EMBODIMENTS

As one embodiment of a broadcast receiving apparatus according to the present invention, a portable telephone 1, which can receive terrestrial digital broadcasting (1 segment broadcasting), will be described.

Figure 1:
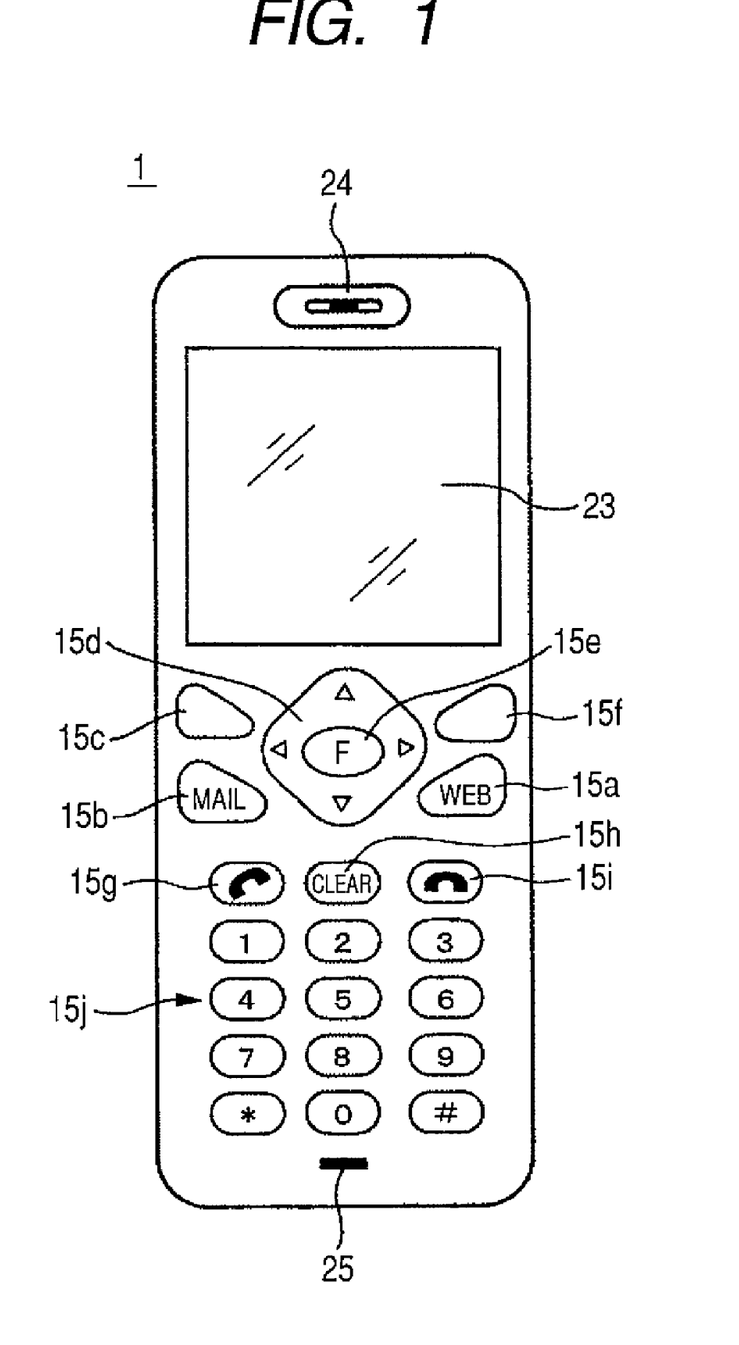
FIG. 1 is a view which shows one example of an external appearance shape of a portable telephone according to an embodiment of the invention.
Figure 2:
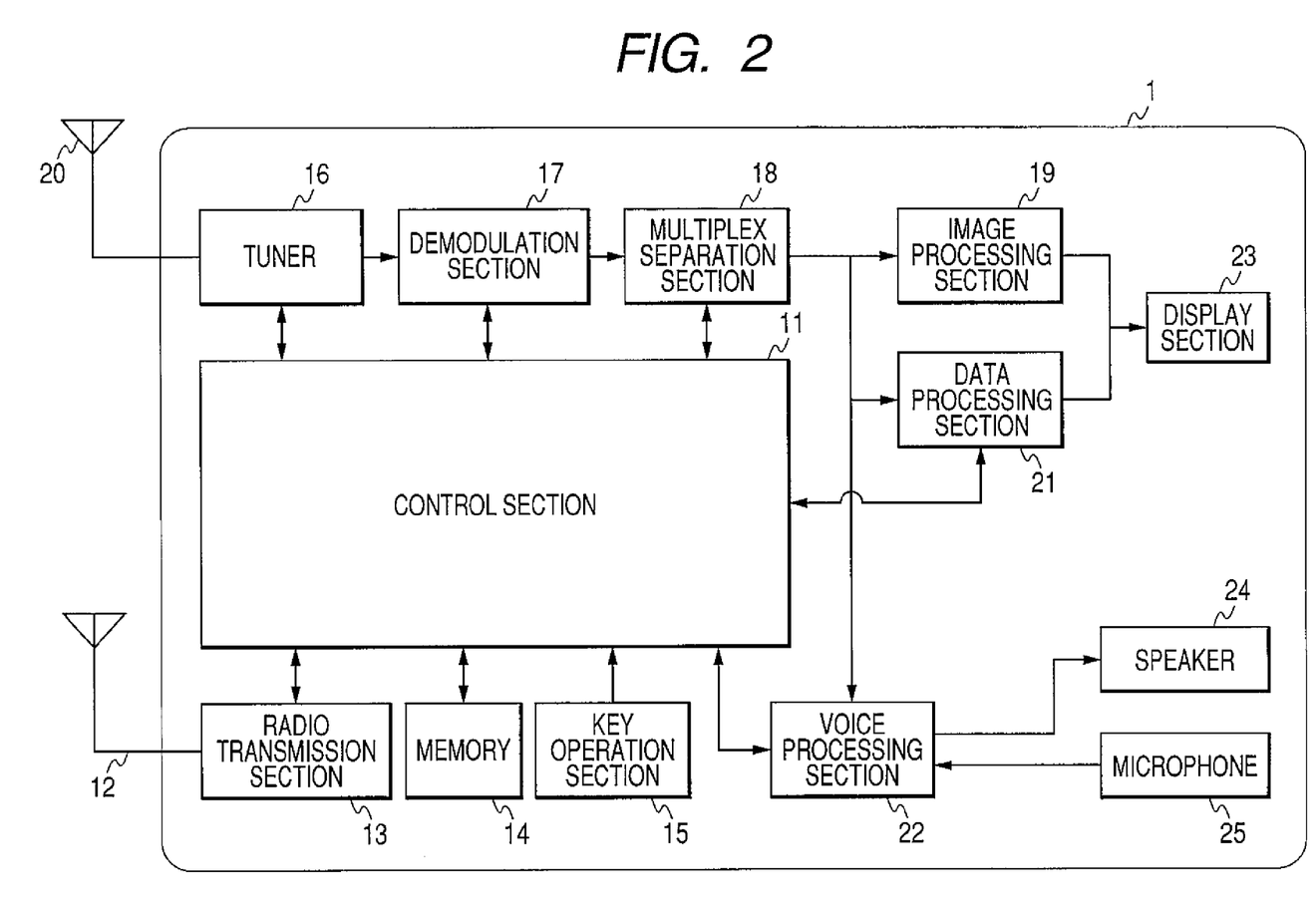
FIG. 2 is a view which shows a system configuration of the portable telephone according to an embodiment of the invention.

FIG. 1 shows one example of an external appearance shape of the portable telephone 1 according to this embodiment, and FIG. 2 is a view which shows one example of a block diagram of the portable telephone 1 according to this embodiment.

Hereinafter, major constituent elements of the portable telephone 1 will be described, in association with FIGS. 1 and 2.

A radio transmission section 13 modulates various data such as voice information and electronic mails being processed in a control section 11, and transmits them to a base station which is not shown in the figure, through a transmitting/receiving antenna 12, in order to perform wireless communication utilizing electromagnetic waves.

In addition, the radio transmission section 13 demodulates various data such as electronic mails and voice information being transmitted from the base station by wireless signals and received by the transmitting/receiving antenna 12, and sends them out to the control section 11.

A memory 14 stores various data which is possessed by the portable telephone 1 of this embodiment, such as an application program such as a telephone calling function, a mailing function and an Internet browser, mail data, and various data of an address book in which names and telephone numbers, etc. are registered. In addition, the memory 14 stores a channel selection time list which will be described later. The channel selection time list is data including a plurality of time data of time at which a channel is selected in a predetermined period.

A key operation section 15 is configured so as to include a plurality of operation keys.

As shown in FIG. 1, the plurality of keys includes, for example, a web key 15a for connecting to Internet, a mail key 15b for executing an electronic mail function, a soft 1 key 15c and a soft 2 key 15f, an up, down, left and right key 15d, a decision key 15e for fixing processing, an off-hook key 15g for performing a call (call request), a clear key 15h, an on-hook key 15i for terminating a call, and ten keys 15j which correspond to numerical characters of "0" through "9", "*", and "#".

The up, down, left and right key 15d is a key which can be operated in up, down, left and right, 4 directions. For example, by an up/down operation of the up, down, left and right key 15d, it is possible to perform a channel selection operation by going up/down a channel of digital broadcasting.

As to the ten keys 15j, buttons of numerical characters etc. are allocated to channel numbers of digital broadcasting, and it is possible to perform a selection operation of channels of digital broadcasting, by pushing the button.

A receiving antenna 20, a tuner 16, a demodulation section 17, and a multiplex separation section (TS separation section) 18 configure reproduction section, and perform reception/output of image signals/voice signals/data signals, etc., of digital broadcasting in the portable telephone 1.

The receiving antenna 20 receives digital broadcasting waves continuously and constantly, and the tuner 16 selects a channel instructed by the control section 11 depending on an operation to the key operation section 15, and outputs broadcasting contents of the selected channel, i.e., transport stream (TS), to the demodulation section 17.

The demodulation section 17 demodulates the transport stream (TS) of the selected and received channel.

Meanwhile, in case that the demodulated transport stream (TS) has been scrambled, descrambling is performed by a descrambler which is not shown in the figure. That is, the descrambler performs processing of permitting such a matter that only a specific digital broadcast receiving apparatus can reproduce (decoding encrypted broadcasting of a conditional access system). Then, in case that the transport stream (TS) has been scrambled, the descrambler is operated under an instruction of the control section 11, and performs descramble processing according to a scramble processing system.

Figure 3:
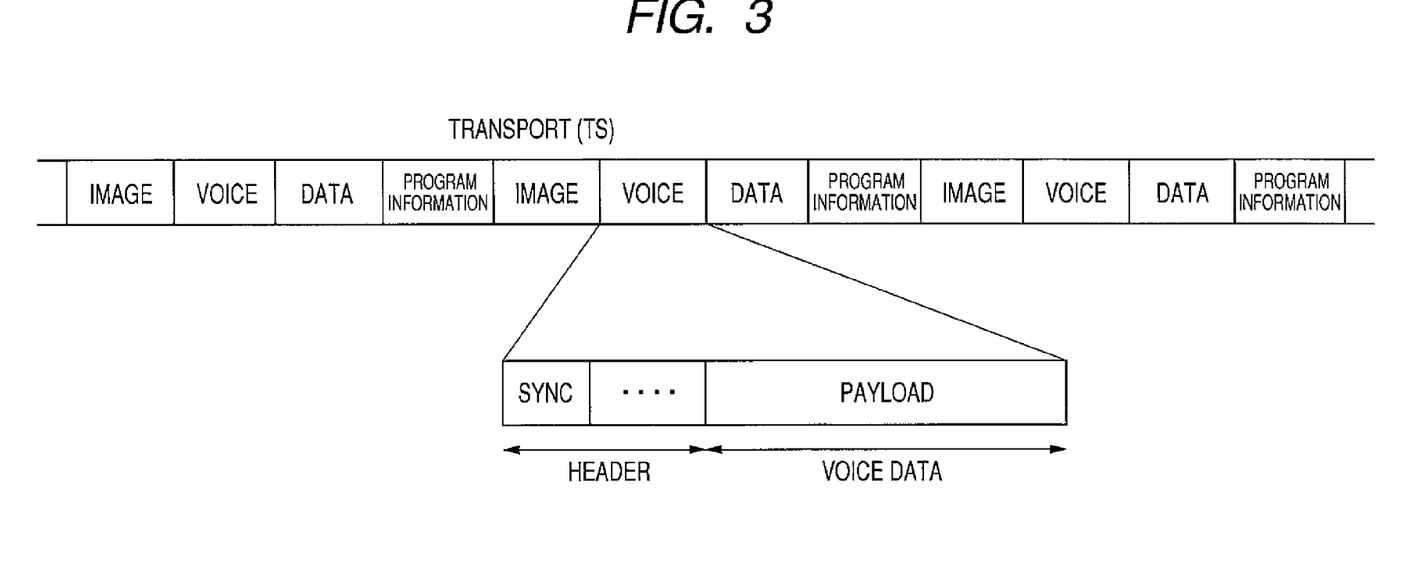
FIG. 3 is a view which shows one example of a configuration of a transport stream (TS).

As to the transport stream (TS), as exemplified TS is shown graphically in FIG. 3, a voice signal, an image signal, a data signal, and program information are multiplexed in a packet unit. For example, a voice signal and an image signal are compressed and encoded by a MPEG (Moving Picture Experts Group) system.

In addition, there is such a case that EPG data (electronic program guide) is included in a data signal.

The above-mentioned transport stream (TS) signal is separated, by the multiplex separation section (TS separation section) 18, into an image signal, a voice signal (audio/voice), a data signal, and program information, every packet.

The separated image signal is decoded, for example by the MPEG system, in an image processing section 19, and displayed on a display section 23 as an image.

The separated voice signal is decoded, for example by the MPEG system, in a voice processing section 22, and outputted through a speaker 24, as voice and/or audio.

As to the separated data signal, its content is analyzed in a data processing section 21, and in case that a content of the data signal relates to a broadcasting service, it is decoded so as to be able to be displayed/reproduced on the display section 23 etc., and display or reproduction is performed. For example, in case that EPG data is included in the data signal, it is decoded in the control section 11 and stored in the memory 14. This EPG data is updated every time new EPG data is received.

The image processing section 19 decodes the separated MPEG system image signal, and outputs an image signal, and drives the display section 23 and has the display section 23 displayed an image. Meanwhile, it is needless to say that the image processing section 19 has the display section 23 displayed not only an image of digital broadcasting, but also a so-called standby screen, telephone number, etc., which correspond to a telephone call function.

The voice processing section 22 applies predetermined processing such as filtering processing and encoding processing, to voice of a user which was collected by a microphone (arbitrarily, abbreviated as MIC) 25, to generate a voice signal. The generated voice data is sent out to a base station which is not shown in the figure, for example through the radio transmission section 13 and the transmitting/receiving antenna 12, for the purpose of a telephone call.

In addition, the voice processing section 22 amplifies voice data received through the transmitting/receiving antenna 12 and the radio transmission section 13, and a voice signal separated by the multiplex separation section (TS separation section) 18, and makes the speaker 24 output voice.

The control section 11 activates, for example an application for receiving digital broadcasting (1 segment broadcasting) (digital broadcasting application). Meanwhile, in case that the application is activated, a program of the application, which has been stored in the memory 14, is loaded in a RAM (Random Access Memory) area.

In additions the control section 11 is configured mainly by a microcomputer, and performs control of the entire portable telephone 1. For example, the control section 11 performs control of transmission/reception of various information by wireless in the radio transmission section 13, processing of voice information to the voice processing section 22, display control of information on the display section 23, processing which depends on input information from the key operation section 15, access control to the memory 14, and so on.

Meanwhile, the control section 11 is one embodiment of a zapping judgment section and a control section.

Figure 4:
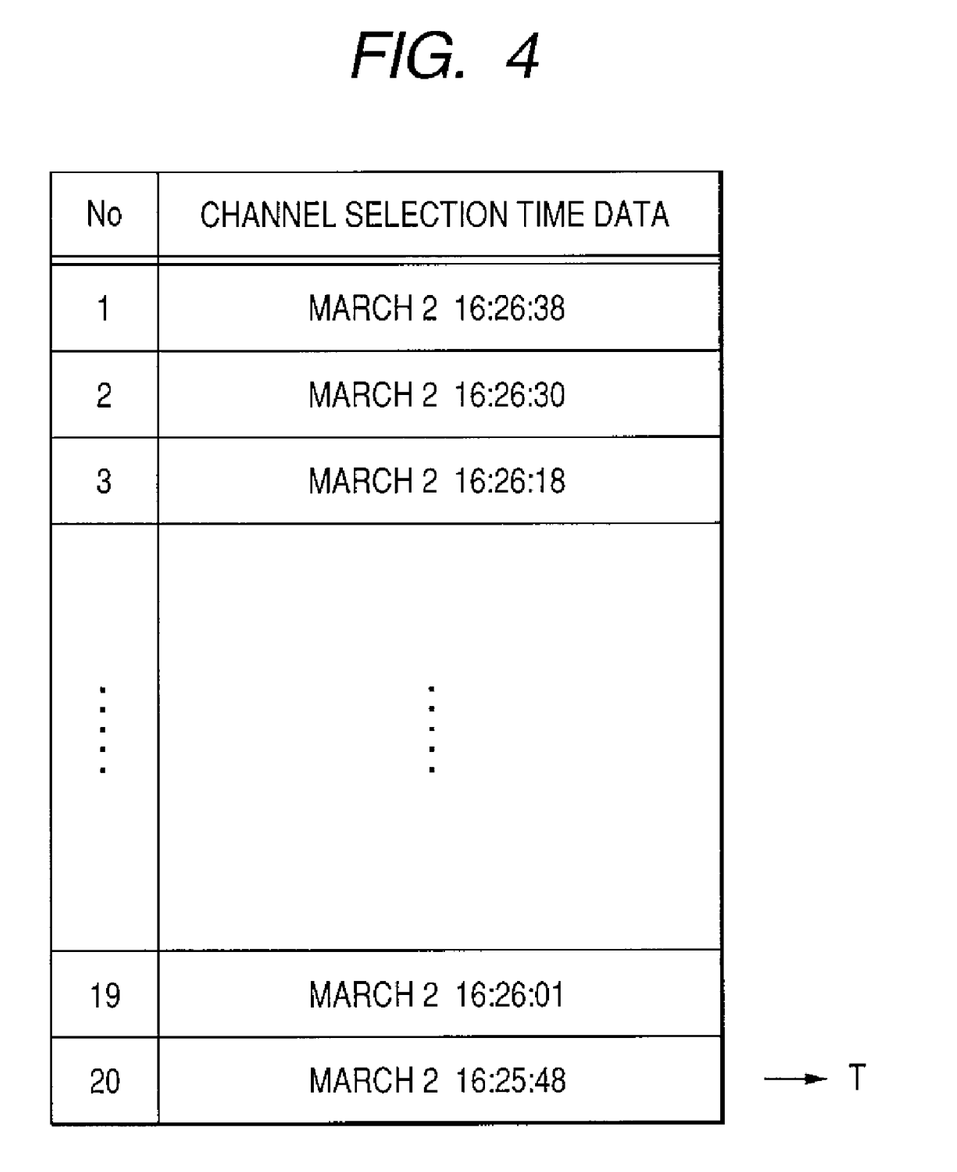
FIG. 4 is a view which shows one example of a channel selection time list.

In addition, the control section 11 has a clock function which measures current time. By this clock function, the control section 11 measures time by the second at which a selection is performed during a fixed period of time, by going back to past from current time, and stores the time in a channel selection time list in the memory 14. FIG. 4 is a view which shows one example of this channel selection time list. The example shown in FIG. 4 shows such data that new channel selection time data has been accumulated from 20-th through 1-st, for every channel selection.

The control section 11 has a zapping judgment function which judges whether or not a zapping operation is performed, from channel selection frequency by use of the key operation section 15. Then, in case that it is judged that the zapping operation is performed, the display section 23 controls the tuner 16, the demodulation section 17, and the TS separation section 18, so as to display a list of programs being broadcasted at the moment.

An operation of the zapping function will be described later.

Figure 5:
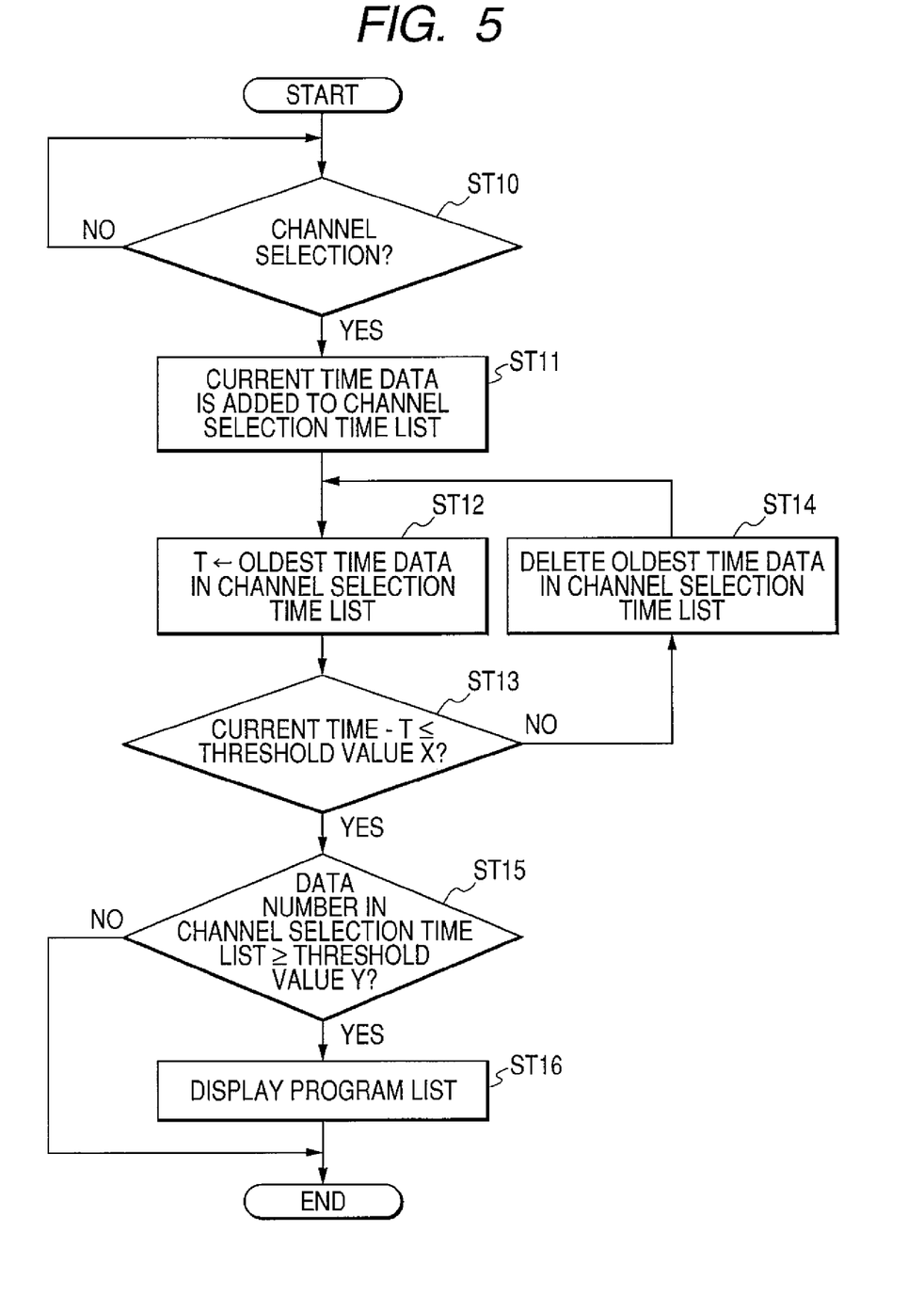
FIG. 5 is a flow chart which shows a zapping judgment operation.

Next, a zapping judgment operation in the portable telephone 1 will be explained by use of a flow cart of FIG. 5.

In the channel selection time list, data of time at which the channel selection is performed during a predetermined period by going back to past from present is always stored as a history. Then, the control section 11, when it judges that a channel selection is performed (step ST10), adds current time data to the channel selection time list in the memory 14 (step ST11).

Next, the oldest time data in the channel selection time list is input to an internal variable T of the control section 11 (step ST12), and it is judged whether or not (current time −T) is smaller than a predetermined threshold value X (step ST13). Then, in case that (current time−T) is larger than the threshold value X, it is judged that sufficient time has passed from time that the oldest time data was stored, and the oldest time data in the channel selection time list is deleted (step ST14).

In case that (current time−T) is equals to or less than the threshold value X in the step ST13, it is judged whether or not the number of time data (data number) in the channel selection time list is larger than a predetermined threshold value Y (step ST15). In case that the data number is larger, it is judged that a lot of time data exist in the channel selection time list within a fixed period of time, thus, channel selection frequency is high, and a zapping channel selection operation is performed, and a display operation of program information, which will be exemplified later, is performed (step ST16).

Next, the display operation of program information will be explained.

Figure 6A:
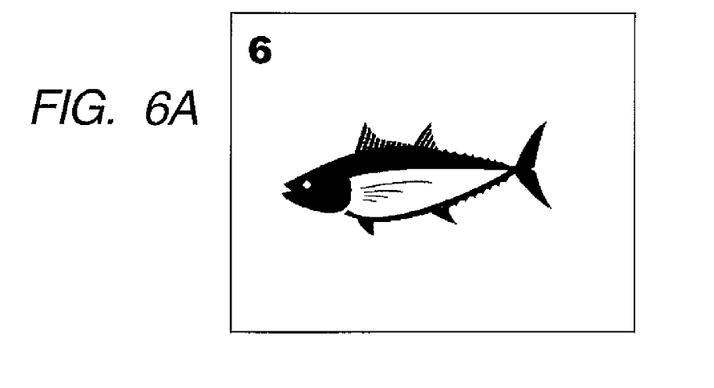
FIGS. 6A, 6B and 6C are views showing one example of a display operation of a program list.
Figure 6B:
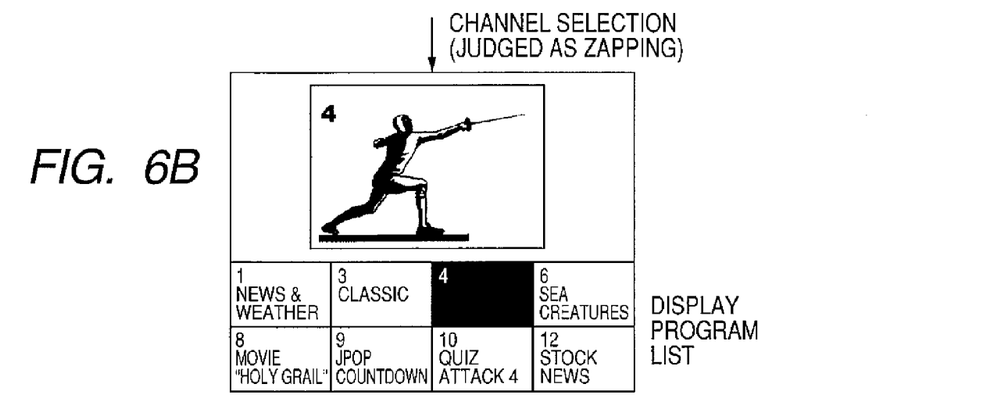
Figure 6C:
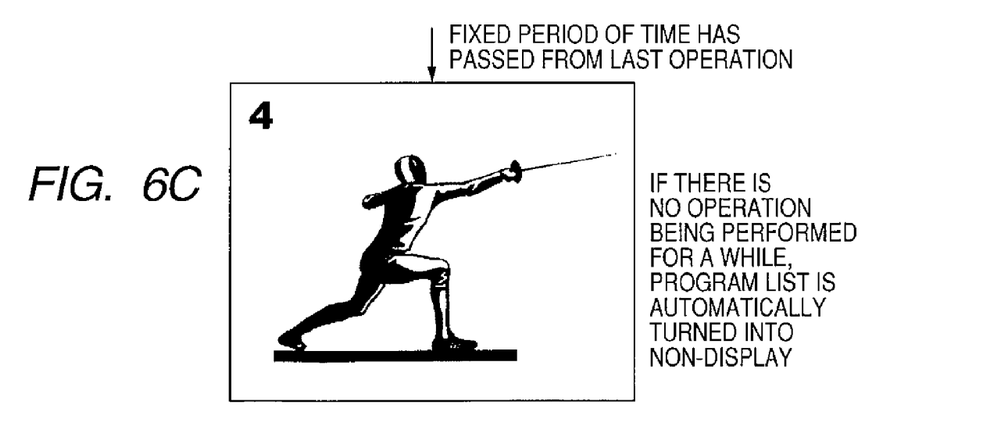

FIGS. 6A to 6C are views which shows one example of the display operation of program information in the display section.

FIG. 6A shows one example of a display screen of the display section 23 at certain time, and in the figure, a channel: 6 is selected. Then, when it is judged that a zapping operation is performed by the above-described operation, display of program information (information related to programs) of each broadcasting station is performed. As display of this program information (information related to programs), for example, as shown in FIG. 6B, images and/or titles of programs of all broadcasting stations, which are currently broadcasted, or program information which shows program contents by simple texts (hereinafter, arbitrarily referred to as "program list") is displayed on a lower section of the display section 23, and one program (in the figure, channel: 4), which is selected from the program list by the up, down, left and right key 15d, is enlarged and image-displayed on the upper section.

Meanwhile, as exemplified in FIG. 6B, in the program list, a program which is not watched/listened after the start of watching/listening of the broadcasting, a program which has been watched/listened, a program which is currently watched/listened, etc., may be displayed distinctly by different colors, respectively.

In addition, the program list may be prepared on the basis of EPG data which is included in a received data signal, and in case of the program list based on EPG information, when EPG information which is stored in a storage section is still effective, the program information is displayed promptly, and as to programs without information, the program information is displayed stepwise as soon as EPG information is obtained. Meanwhile, in such a system that it is not possible to obtain EPG data of each broadcasting station unless broadcast waves of each broadcasting station are received, a tuner is sequentially shifted to each broadcasting station to obtain EPS data, and a program list is prepared. In addition, in case that a plurality of tuners are mounted, it is possible to prepare a program list while displaying an image of a program which is now selected.

In addition, if there is a broadcasting station which broadcasts information related to all programs, that broadcasting station may be selected.

In addition, EPG data obtained from a server on Internet through the radio transmission section 13 may be used as EPG data of this program list.

Then, in case that an operation is not performed for a fixed period of time (selection of a new channel is not performed) after the program list is displayed, as shown in FIG. 6C, a program (channel), which is being selected on the program list at that time point (in a selection frame), is displayed so as to fill the entire screen of the display section 23 (full-screen display is performed). Meanwhile, it is also possible to select a channel which is selected by performing decision/selection through the use of a selection frame (cursor) on the program list.

Next, a desirable method of channel selection judgment will be described, in association with FIGS. 7A-7D.

FIGS. 7A-7D are views showing a channel selection judgment which depends on an operation of the up, down, left and right key 15d.

In the portable telephone 1, a switching of a channel (channel selection) is performed depending on an operation of the up, down, left and right key 15d in up and clown directions. Then, in the control section 11, it is judged that a channel selection is performed, when, after a program to be displayed is switched depending on a key operation in one direction (up direction or down direction), a key operation in the same direction as that direction is performed within a predetermined period (in the figure, e.g., 1 second), or when a key operation in an opposite direction to that direction is performed. Thus, a switching from an up channel selection to a down channel selection of a channel, or a switching from a down channel selection to an up channel selection is judged that a channel selection is performed.

Figure 7A:
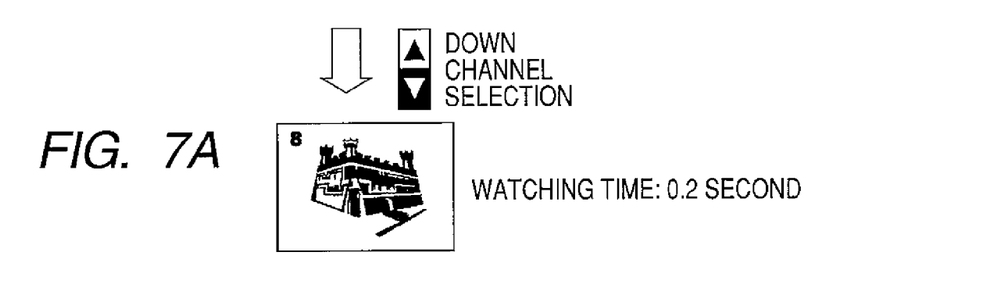
FIGS. 7A, 7B, 7C and 7D are views showing channel selection judgment which depends on a key operation.
Figure 7B:
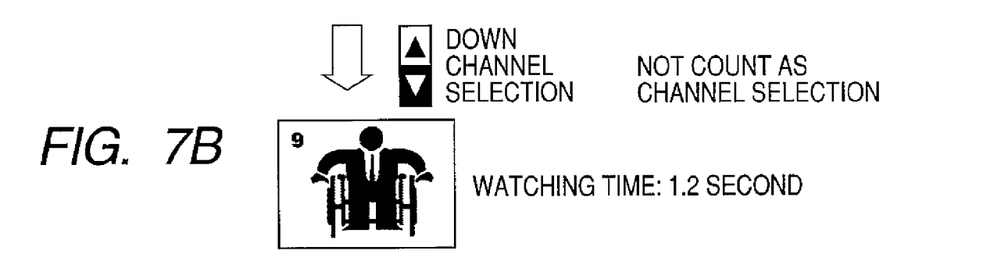
Figure 7C:
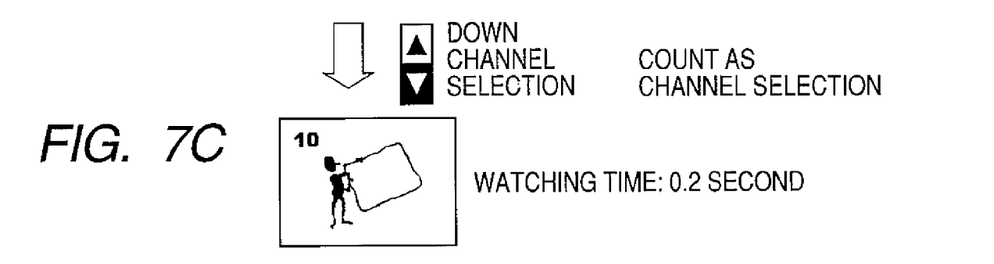
Figure 7D:
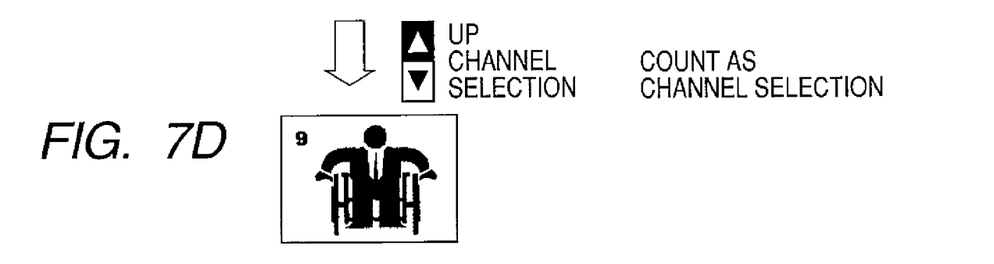

In FIGS. 7A-7D, in case that program display of FIG. 7A is performed by a down direction operation (down channel selection) and after a watching period of 0.2 second, program display shown in FIG. 7B is further performed by a down direction operation in the same direction, the watching period is less than 1 second, and therefore, it is not judged that the channel is selected. In case that new program display shown in FIG. 7C is performed by a down direction operation (selection of a channel) after a watching period of 1.2 second (after the passage of a predetermined period) from the display of FIG. 7B (selection of the channel), the watching period exceeds a threshold value of 1 second, and therefore, it is judged that a channel is selected as an element of judging zapping. In case that program display shown in FIG. 7D is performed by an up direction operation (up channel selection) which is opposite to the operation up to now, after a watching period of 0.2 second from the display of FIG. 7C, the watching period is less than 1 second, but an operation direction is switched, and therefore, it is judged that a channel selection is performed as an element of judging zapping.

In this way, by not judging that a switching, etc., of a program by a continuous operation in the same direction, which is usually performed, as a channel selection in zapping judgment, it is possible to improve the precision of the zapping judgment.

As explained above, according to the portable telephone 1 according to this embodiment, by calculating channel selection frequency on the basis of the channel selection time list in the memory 14, when a zapping operation by a user is judged automatically, display of program information (information related to programs) of each broadcasting station is performed. In addition, it becomes possible to select a desired program by utilizing display of the program information (information related to programs).

Therefore, it becomes possible for a user to effectively select a program to view in a short time without performing a special operation by oneself.

The above-described embodiment is simply an exemplification of the present invention, and the present invention is not limited to the above-described embodiment. For example, in the above-described embodiment, an example is explained by using a case of digital broadcasting, but it is also applicable to a case of analog broadcasting.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A broadcast receiving apparatus comprising:
    a channel selection section which selects a broadcasting channel from among a plurality of broadcasting channels;
    a storage section which stores a time when a channel selection is performed by the channel selection section;
    a determination section which determines whether the channel selection is performed more than a threshold number of times within a specific time period with reference to times stored in the storage section; and
    a display section which controls a display to display a list of programs currently broadcasted by the broadcasting channels.

* * * * *